Feb. 23, 1965 J. W. HOOVER 3,170,701
SEALING WASHER
Filed May 15, 1961
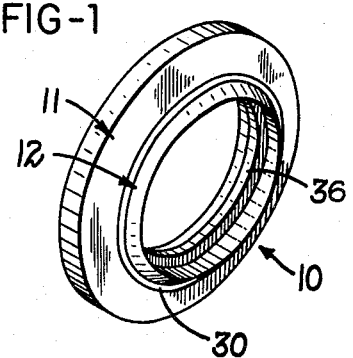
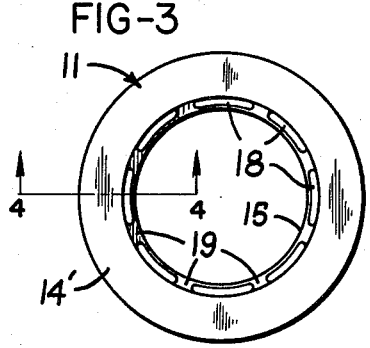
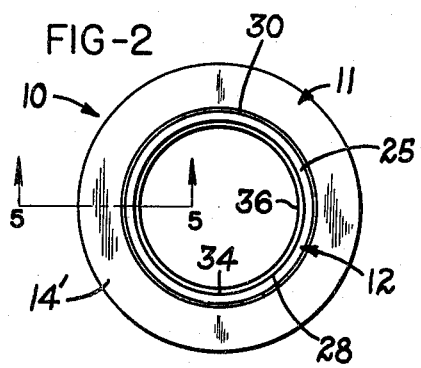
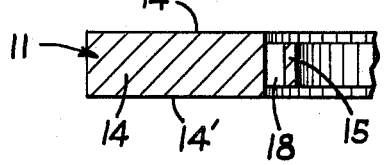
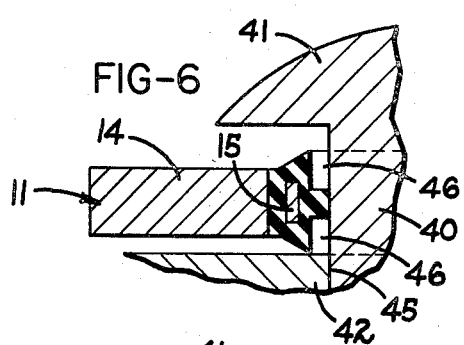
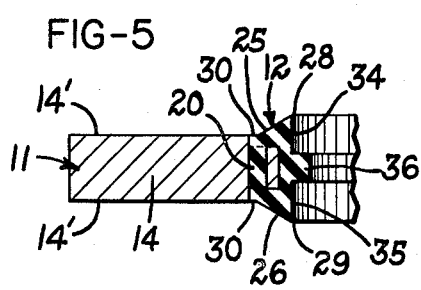
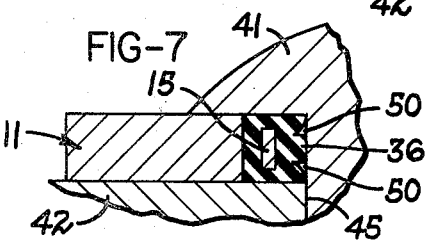
*INVENTOR.*
JOHN W. HOOVER
BY
*Marchal, Biebel, French & Bugg*
ATTORNEYS

United States Patent Office 3,170,701
Patented Feb. 23, 1965

3,170,701
SEALING WASHER
John W. Hoover, Dayton, Ohio, assignor to Precision
  Rubber Products Corp., Dayton, Ohio, a corporation of
  Ohio
Filed May 15, 1961, Ser. No. 109,997
6 Claims. (Cl. 277—180)

This invention pertains to sealing washers and more particularly to such washers having another supporting ring and an elastomeric sealing member integrally molded thereto.

The sealing ring of this invention is a pressure sealing type and is preferably formed with outer pressure sealing lips. Under compression, such lips are forced into intimate sealing contact with the adjacent surfaces to be sealed with outer surfaces substantially into the plane of the outer supporting ring. Normally, sealing washers of the pressure sealing type have been formed by bonding the elastomeric inner ring to an inside surface of the metallic outer supporting ring. A suitable bond has been found difficult and relatively costly to achieve in quantity production and necessitates an additional step of preparing the joining metallic ring surface by blasting or etching and applying a suitable bonding cement or resin to form a connection between the elastomeric ring and the supporting ring.

The sealing washer of this invention eliminates the bonding of the elastomeric ring to the supporting ring and achieves superior holding qualities by the provision of a mooring ring portion on the outer supporting ring. A plurality of transverse openings are peripherally formed within the mooring ring portion and are proportioned to extend over a major peripheral portion thereof and occupy a substantial portion of the area of the mooring ring. Also, the mooring ring portion is preferably formed of limited radial depth, the radial extent thereof being a small part of the total radial extent of the outer ring. Thus, the mooring ring does not interfere with the compression of the sealing lips of the elastomeric ring.

The elastomeric sealing ring is formed by pressure molding to the outer ring with integral webs extending through the openings formed in the mooring ring, thus forming a mechanical interlocking interconnection. A substantial portion of the material of the elastomeric ring at the mooring ring portions consists of the webs of material extending through these openings.

The sealing washer is preferably proportioned so as to have a working clearance between the inner circumference of the washer at the terminal edges of the lips and the nominal O.D. of the bolt or shank upon which the washer is mounted. Such clearance provides for the movement of the elastomeric material of the lips into the plane of the washer under compression. However, such clearance also allows misalignment of the sealing washer in assembly. Often, when used with bolts having small heads, the sealing lip of the elastomeric ring may be uncovered due to such misalignment, or the sealing lip may come into contact with the chamfer or lead thread of a tapped hole. Also, the lack of accurate centering results in the loss of some or all of the clearance on one side of the washer with the resulting interference by the bolt with the desired compressional movement of the sealing lips.

The above difficulties are eliminated in the washer of this invention by the provision of a centering ring on the elastomeric portion having an I.D. which closely approximates the nominal bolt diameter and assures positive centering and maintenance of the desired clearance at the inner edges of the pressure lips. The centering ring does not interfere with the sealing action of the lips but assures the best possible sealing conditions.

The contour and dimensions of the elastomeric ring are proportioned so as to provide for the compressional movement of the sealing lips with a minimum of excess clearance after compression. This results in peripheral sealing contact of relatively high force distributed over a relatively small sealing area, resulting in an effective seal in a wide variety of installations.

It is therefore a primary object of this invention to provide a sealing washer as outlined above characterized by its ruggedness, inexpensive construction, and its ability to provide a trouble-free seal for high pressure operation.

A further object of this invention is to provide a sealing washer with a mooring ring having openings forming a substantial portion thereof for the molding of an elastomeric ring thereto.

A still further object of this invention is to provide a sealing washer as outlined above provided with pressure sealing lips and a centering ring for assuring a working clearance for such lips.

Another object of this invention is to provide a sealing washer as outlined above eliminating all bonding between the elastomeric and metal portions.

A further object of this invention is to provide a sealing washer having an integral mooring ring wherein the ring is formed with openings and has a small radial depth as compared with the total depth of the outer ring.

Other objects and advantages of the invention will be apparent from the following description, the accompanying drawings and the appended claims.

In the drawings—

FIG. 1 is a perspective view of a washer constructed according to this invention;

FIG. 2 is a plan view of the washer of FIG. 1;

FIG. 3 is a plan view of the outer support ring;

FIG. 4 is an enlarged sectional view through the support ring taken generally along the line 4—4 of FIG. 3;

FIG. 5 is an enlarged section through the finished washer taken generally along the line 5—5 of FIG. 2;

FIG. 6 is a sectional view showing a typical installation of the washer prior to compression; and FIG. 7 is a sectional view similar to FIG. 4 showing the washer under compression.

Referring to the drawings which illustrates a preferred embodiment of the invention, the washer constructed according to this invention is illustrated generally at 10 in FIGS. 1 and 2 as including an outer support ring 11 and an elastomeric sealing ring 12 supported on the inner periphery of the ring 11.

Referring particularly to FIGS. 3 and 4, the outer support ring 11 is shown as being formed with an outer portion 14 having substantially planar and parallel opposite sides 14'. An annular inner mooring portion 15 of reduced cross section thickness as compared to the portion 14 is centrally and symmetrically formed as an integral part of the inner periphery of the support ring, as by stamping or crimping. The mooring portion 15 is formed with a radial extent which is small as compared to the overall radial extent of the support ring 11. The support ring 11 is preferably formed of metal, and such metals as stainless steel, cadmium plated steel, brass, and aluminum may be used by way of example, and it is further within the scope of this invention to use suitably rigid non-metallic substances.

The mooring portion 15 includes means defining a plurality of generally arcuate or kidney-shaped openings 18 therethrough. The openings 18 are positioned closely adjacent the inner circumference of the outer portion 14 and are separated from each other by relatively narrow bridges 19 of ring material. The openings 18 are proportioned to occupy the major portion of the peripheral extent of the mooring portion 15. Thus, by way of example, eight openings 18 may be provided with a span of approximately 30° and the bridges 19 may, by way of example, have a span of approximately 15°. Also, the openings 18 within the mooring ring portion 15 are proportioned to occupy a substantial portion of the total area of such mooring ring. By way of example, the openings 18 may occupy approximately 50% of the total area generated by the mooring ring portion 15.

The elastomeric sealing ring 12 is molded entirely radially within the dimensions of the outer portion 14 of the support ring 11, as shown in FIG. 5, and may be formed of any suitable moldable material, such as natural or synthetic rubbers or any other suitable elastomeric sealing material. The ring 12 is secured to the mooring ring portion 15 by pressure molding within a mold cavity, and by subsequently curing. Webs 20 of the elastomeric material are thereby formed through the openings 18 and serve as integral connecting and locking portions thus forming a mechanical interlocking connection of the sealing ring 12 with the support ring 11. The webs 20 comprise a substantial portion of the material of the elastomeric ring at the mooring ring portion 15.

The cross sectional contour of the ring 12 and the effective clearances determine its sealing properties, and the washer of this invention is formed with a highly effective sealing contour including outer side walls 25 and 26 which are coterminous at their outer periphery with the sides 14' of the outer portion. The side walls 25 and 26 diverge axially outwardly with decreasing radius, preferably with a straight slope, from a point adjacent the junction thereof at the outer portion 14. The walls 25 and 26 are terminated radially inwardly of the innermost extent of the mooring portion 15 and form projecting sealing lips 28 and 29. The walls 25 and 26 may each have an angle of divergence of 30° measured from the plane of the sides 14', for example.

A relatively narrow flat or straight portion 30 is formed at the junction of the sides 14' of the outer portion 14 with the side walls 25 and 26 of the ring 12. The flat portion 30 performs two functions. First, it is generally undesirable to mold a part wherein an angle is intersected with a straight section. The portion 30 provides the means for intersecting a straight section of the ring 12 with a straight section of the outer support ring 11. Also, the portion 30 allows for normal tolerances in the manufacture of the washer in regard to the relative centering of the support ring 11 and the mold cavity for the ring 15. In other words, the portion 30 assures that no elastic material intersects or is formed over the sides of the supporting ring due to slight misalignment of the support ring 11 and the mold cavity. Thus, the flat portion 30 assures that no material will be molded over the outer surface of the support ring which would result in the extrusion of such material under pressure along the flat sides 14' of the washer 10.

The inside surface of the washer and of the ring 12 is preferably formed with a pair of generally cylindrical portions 34 and 35 extending from the opposite lips 28 and 29 and formed on the axis of the washer. However, it is understood that it is within the scope of this invention to make the walls of the portions non-linear such as recessed, or otherwise non-cylindrical. The cylindrical portions 34 and 35 are separated by a centering rib or ring 36 which is preferably centrally disposed therebetween.

The portions 35 and 34 are preferably formed with a diameter which is slightly greater than the nominal diameter of the bolt upon which the washer is intended for use. This provides a clearance at the lips 28 and 29 which may be in the order of 15 thousandths of an inch, as an example, and provides for the substantial unrestricted flow of the material of the lips 28, 29 when the side walls 25 and 26 of the elastomeric ring are compressed into the plane of the sides of the outer support ring 11. The inside diameter of the centering ring 36 is proportioned to form a close fit on or over the bolt upon which the washer 10 is intended for use. When the washer is used on a threaded bolt, it is anticipated that the centering ring 36 may be deformed slightly by the threads, thus providing a gripping of the washer thereon. The ring 36 assures that a desired clearance between the lips 28 and 29 and the adjacent surface of the bolt is maintained, and further assures that the ring 12 does not become exposed from beneath the bolt head due to lack of centering. It also assures the maintenance of the desired clearance between the lips and the hole or lead threads in an adjacent member through which a support bolt may be extended.

Referring to FIGS. 6 and 7, one example of the use of the washer of this invention is illustrated. FIG. 4 shows a fragment of the washer 10 positioned in a typical installation mounted on any suitable shank member such as the body of a rivet 40 between the rivet head 41 and an adjacent plate 42, prior to the securing of the rivet. The washer 10 will thus serve to seal the opening 45 through which the rivet shank is extended, when the rivet is secured thereon, as shown in FIG. 7. In FIG. 6, it can be seen that the centering ring 36 is provided with a relatively close fit on the shank and holds the washer 10 centered thereon with clearance spaces 46 between the lips 28 and 29 and the adjacent surface of the rivet body.

FIG. 7 shows the washer 10 after it has been compressed, such as by the drawing down of the rivet head 41. It is understood that the washer 10 may be used to seal bolts, machine screws, and the like, with the same compressional effect under those circumstances of use. Since the elastomeric material of the ring 12 is formed under pressure, it contains no cavities or voids and is therefore incompressible. Under the compressional force of the usage or installation, the material of the ring, primarily defined within the triangular portions of material formed by the diverging sides 25 and 26 and the plane of the sides 14', elastically flows into the clearance spaces 46.

The centering ring 36 is proportioned to occupy a given space which affects this compressional movement of the ring material so that the inner surface of what was the cylindrical portions 34 and 35 in the free state form inwardly slanting sides which are convex in contour, as shown in FIG. 7. Small interstices or voids 50 may be formed after compression between the lips and the centering ring. The amount of outward or convex curvature is a function of the amount of clearance volume represented by the spaces 46, the amount of ring 12 material compressed, and the volume occupied by the centering ring 36. The dimensions of the washer are preferably such that the interstices 50 are small as compared to the volume occupied by the lips so as to provide a maximum of sealing compressional force. It is anticipated that under some circumstances there will remain substantially no clearance space 50 after compression.

As clearly shown in the drawings, the radial extent of the elastomeric sealing ring 12, as measured along the outer surface of the lips 25 and 26, substantially exceeds the axial thickness of the centering rib or ring 36. Also, as shown, the rib 36 is formed with an axial thickness which is less than one-half the thickness of the support ring 11. Thus, when the ring 12 is compressed as shown in FIG. 7, a substantially greater sealing surface in area is formed radially along the outer surface of each of the lips than is formed axially of the centering ring 36 on the shank of the rivet.

The compressed effect which is achieved by this invention results in a washer which exhibits excellent sealing qualities in that it provides high outward radial force at the lips 28 and 29 and at the walls 25 and 26. Thus, the material of the walls tends to assume the contour of the adjacent surfaces being sealed and thus provides an effective seal in spite of irregularities or imperfections in such surfaces. It has been found that 200 inch pounds of torque on a bolt employing a washer of this invention will serve to contain 10,000 p.s.i. for 24 hours with no significant pressure yield.

It is therefore seen that this invention provides a sealing washer wherein all bonding between the elastomeric portion and the supporting ring portion is eliminated and wherein a secure mechanical connection is assured by the arrangement of the openings 18 formed within the mooring ring portion 15. The limited radial extent of the portion 15 as compared to the total radial extent of the support ring 11 assures that the mooring ring portion 15 does not interfere with the compressional movement of the sides 25, 26 and the lips 28, 29 in the compression thereof. The relatively large openings 18, as described, provides for a substantial portion of the elastomeric material of the ring 12 extending therethrough. Such portion is large as compared to the bridges 19 and results in a positive and strong mechanical connection of the ring 12 to the support ring 11.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A sealing washer for sealing a bolt, rivet, or the like having a head and a shank, comprising an outer support ring formed with an outer portion having substantially planar sides and an annular inner mooring portion of reduced cross sectional thickness symmetrically formed with respect to said outer portion, means in said mooring portion defining a plurality of generally arcuately formed openings therethrough positioned wholly within said mooring portion and closely adjacent the inner circumference of said outer portion and proportioned to occupy a major portion of the peripheral extent of said mooring portion, an elastomeric sealing ring molded entirely radially within said outer portion with integral webs formed through said openings, said sealing ring having outer side walls coterminous with the sides of said outer portion and diverging axially outwardly from a point adjacent the junction thereof at said outer portion and terminating radially inwardly of the innermost extent of said mooring portion, a centrally positioned peripherally continuous centering rib formed in said sealing ring and having an inside diameter proportioned to form a close fit on such shank to hold said washer centered thereon, said diverging sides being compressible by said head radially inwardly into the clearance between it and such shank substantially into the plane of the outer portion to form a compression sealing fit highly resistant to flow of fluid thereby.

2. A sealing washer for sealing a bolt, rivet, or the like having a head and a shank, comprising an outer support ring formed with an outer portion having substantially planar sides and an annular inner mooring portion of reduced cross sectional thickness with respect to said outer portion, means in said mooring portion defining a plurality of openings therethrough positioned wholly within said mooring portion and closely adjacent the inner circumference of said outer portion and separated by relatively narrow bridges of ring material, an elastomeric sealing ring molded entirely radially within said outer portion with integral webs formed through said openings, said sealing ring having outer side walls formed with a relatively narrow flat portion coterminous with the sides of said outer portion, said wall diverging axially from said flat portion outwardly with a uniform slope from a point adjacent the junction thereof at said outer portion and terminating at an inside sealing ring surface radially inwardly of the innermost extent of said mooring portion, the inside surface of said sealing ring being formed with a centrally positioned centering rib having an inside diameter proportoned to form a close fit on such shank to hold said washer centered thereon, said diverging sides being compressible by said head radially inwardly into the clearance between it and such shank substantially into the plane of the outer portion to form a compression sealing fit highly resistant to flow of fluid thereby.

3. A sealing washer for sealing a bolt, rivet, or the like having a head and a shank, comprising a metallic outer ring formed with an outer portion having flat sides and an annular inner mooring portion of reduced cross sectional thickness with respect to said outer portion, means in said inner portion defining a plurality of generally kidney-shaped punched openings therethrough comprising a substantial portion of the area of said mooring portion positioned wholly within said mooring position closely adjacent the inner circumference of said outer portion, an elastomeric sealing ring molded entirely radially within said outer portion with integral webs formed through said openings, said sealing ring having outer side walls coterminous with the sides of said outer portion and diverging axially outwardly from a point adjacent the junction thereof at said outer portion and terminating at an inside sealing ring surface radially inwardly of the innermost extent of said mooring portion, the inside surface of said sealing ring being formed into a pair of cylindrical portions having a diameter slightly greater than that of the shank upon which the washer is intended for use separated by a centrally positioned peripherally continuous centering rib having an inside diameter proportioned to form a close fit on such shank to hold said washer centered therein, said diverging sides being compressible by such head radially inwardly into the clearance between it and the shank substantially into the plane of the outer portion to form a compression sealing fit highly resistant to flow of fluid thereby.

4. A sealing washer for sealing a bolt, rivet, or the like having a head and a shank, comprising an outer support ring formed with an outer portion having substantially planar sides and an annular inner mooring portion of reduced cross sectional thickness symmetrically formed with respect to said outer portion, means in said mooring portion defining a plurality of generally kidney-shaped punched openings therethrough positioned closely adjacent the inner circumference of said outer portion and separated by relatively narrow bridges of ring material as compared to the openings, an elastomeric sealing ring molded entirely radially within said outer portion with integral webs formed through said openings, said sealing ring having outer side walls coterminous with the sides of said outer portion and diverging axially outwardly with a uniform slope from a point adjacent the junction thereof at said outer portion and terminating at an inside sealing ring surface radially inwardly of the innermost extent of said mooring portion, said inside surface being formed into a pair of cylindrical portions having a diameter slightly greater than that of said shank upon which the washer is intended for use separated by a centrally positioned centering rib having an inside diameter proportioned to form a close fit on such shank to hold said washer centered thereon, said diverging sides being compressible by such head radially inwardly into the clearance between it and such shank substantially into the plane of the outer portion to form a compression sealing fit highly resistant to flow of fluid thereby.

5. A sealing washer comprising an outer support ring and an inner elastomeric sealing ring secured entirely radially within said outer support ring and joining said outer ring along generally unbroken lines, said sealing ring having outer side walls coterminous with the sides of said outer ring and diverging axially outward from a point adjacent the junction with said outer ring and terminating at an inside ring surface defining opposite lips positioned radially inwardly of said outer ring, said inside surface of said sealing ring being formed with a peripherally continuous centering rib having an inside diameter proportioned to form a relatively close fit on a shank member to be sealed to hold said washer centered thereon, each of said outwardly diverging side walls comprising said lips having a radial dimension which substantially exceeds the axial thickness of said centering rib, said opposite lips being compressible in use inwardly toward said centering rib into the clearance defined between said inside surface and such shank member leaving a minimum of free space therebetween to form a compression sealing fit along the radial extent of said sealing lips defining sealing surfaces at said lips each of which substantially exceed, in area, the axial contact surface of said centering rib on such shank member.

6. The sealing washer of claim 5 wherein said lips diverge at approximately 30° to the plane of said outer ring, and wherein the axial extent of said centering rib is less than one-half the axial thickness of said outer ring.

References Cited in the file of this patent

UNITED STATES PATENTS

| | | |
|---|---|---|
| 2,717,793 | Nenzell | Sept. 13, 1955 |
| 2,795,444 | Nenzell | June 11, 1957 |
| 3,062,557 | Underwood | Nov. 6, 1962 |

FOREIGN PATENTS

| | | |
|---|---|---|
| 554,738 | Italy | Jan. 15, 1957 |
| 836,197 | Great Britain | June 1, 1960 |